Aug. 18, 1942.  A. E. ANDERSON  2,293,484
CONTROL SYSTEM
Filed June 27, 1940
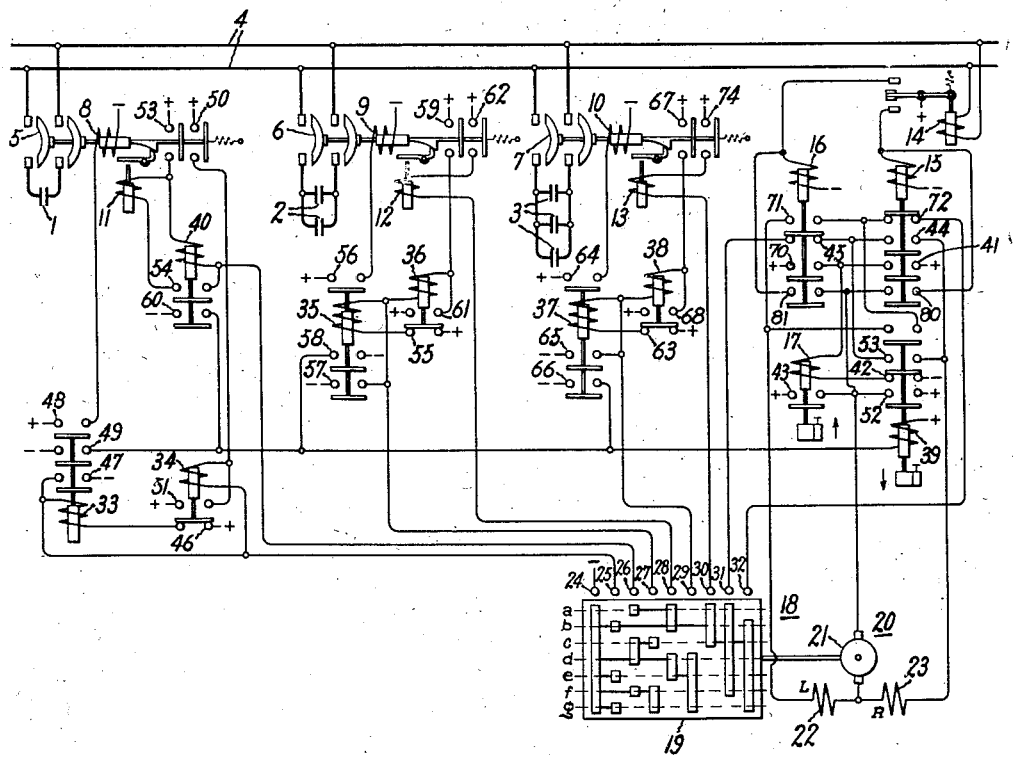
Inventor:
Arvid E. Anderson,
by Harry E. Dunham
His Attorney.

Patented Aug. 18, 1942

2,293,484

UNITED STATES PATENT OFFICE 2,293,484

CONTROL SYSTEM

Arvid E. Anderson, Drexel Hill, Pa., assignor to General Electric Company, a corporation of New York Application June 27, 1940, Serial No. 342,763

6 Claims. (Cl. 172—238)

My invention relates to control systems and particularly to systems for controlling the connections between an electric circuit and a plurality of reactance devices, such as capacitors, so as to improve the power-factor and the voltage of the circuit.

In order to prevent wide variations in the electric condition of the circuit, such as the voltage, which it is desired to maintain constant, it is necessary that the changes in the amount of reactance connected to the circuit be relatively small. Also it is desirable to keep to a minimum the amount of switching apparatus required to effect the desired reactance changes in order to keep the cost of such switching apparatus as low as possible.

One object of my invention is to provide an improved arrangement of apparatus for controlling the connections between an electric circuit and a plurality of reactance devices whereby desired equal changes in the amount of reactance connected to the circuit can be effected with the minimum amount of switching apparatus.

In accordance with my invention, I provide a plurality of reactance devices respectively having reactances, which differ in an arithmetical progression, the smallest reactance being equal to the minimum change it is desired to effect in the amount of reactance connected to the circuit. An individual switch is provided for connecting each reactance device to the electric circuit, and suitable means are provided for selectively operating the various switches so that the amount of reactance connected to the circuit is progressively varied automatically in equal increments until the desired electric condition of the circuit is obtained.

My invention will be better understood from the following description when taken in connection with the accompanying drawing the single figure of which diagrammatically illustrates a capacitor control system embodying my invention, and its scope will be pointed out in the appended claims.

Referring to the accompanying drawing, 1, 2 and 3 represent capacitors respectively having capacities which differ in an arithmetical progression. For example, capacitor 1 has a capacity equal to the minimum change it is desired to effect in the amount of capacity connected to circuit 4; capacitor 2 has a capacity equal to twice the capacity of capacitor 1; and capacitor 3 has a capacity equal to three times the capacity of capacitor 1. Capacitors 1, 2 and 3 are adapted to be connected to alternating current circuit 4 by means of circuit breakers 5, 6 and 7, respectively, which may be of any suitable type examples of which are well known to the art. As shown in the drawing, circuit breakers 5, 6 and 7 are of the well known latched-in type and are respectively provided with closing coils 8, 9 and 10 and trip coils 11, 12 and 13.

In order to control the connections between capacitors 1, 2 and 3 and circuit 4 in response to a predetermined electric condition of circuit 4, which in the particular arrangement shown in the drawing is the voltage of circuit 4, I provide a contact-making voltmeter 14 which is connected to circuit 4. Voltmeter 14 is arranged to effect the completion of an energizing circuit for a control relay 15, when the voltage of circuit 4 is below a predetermined value, and the completion of an energizing circuit for a control relay 16, when the voltage of circuit 4 is above a predetermined value. When either control relay 15 or 16 is energized, an energizing circuit is completed for a time relay 17, which, after being energized for a predetermined time, initiates the operation of a suitable multiposition switch 18 to effect the necessary operations of circuit breakers 5, 6 and 7 to change, in equal increments, the amount of capacity connected to circuit 4 until the voltage thereof is restored to its normal value. As shown in the drawing, multiposition switch 18 is a motor driven controller having a cylindrical drum 19 driven by a reversible motor 20 which is provided with an armature winding 21 and two field windings 22 and 23. When armature winding 21 and field winding 22 are simultaneously energized, motor 20 rotates in a direction to effect a decrease in the amount of capacity connected to circuit 4. When armature winding 21 and field winding 23 are simultaneously energized, motor 20 rotates in the opposite direction and effects an increase in the amount of capacity connected to circuit 4. Cylindrical drum 19 carries contacts which respectively engage stationary contacts 24—32, inclusive, in various positions of the drum. As shown, drum 19 has seven stopping positions respectively marked $a$—$g$, inclusive. In position $a$, circuits are completed by controller 18 to effect the opening of circuit breakers 5, 6 and 7. In position $b$, circuits are completed to effect the closing of circuit breaker 5 and the opening of circuit breakers 6 and 7. In position $c$, circuits are completed to effect the closing of circuit breaker 6 and the opening of circuit breakers 5 and 7. In position $d$, circuits are completed to effect the closing of circuit breaker 7 and the opening of circuit breakers 5 and 6. In position e, circuits are completed to effect the closing of circuit breakers 5 and 7 and the opening of circuit breaker 6. In position f, circuits are completed for effecting the closing of circuit breakers 6 and 7 and the opening of circuit breaker 5. In position g, circuits are completed to effect the closing of all of the circuit breakers.

Closing coil 8 of circuit breaker 5 has associated therewith two control relays 33 and 34. An energizing circuit for control relay 33 is completed by controller 18 when it is in a position to effect the closing of the switch 5. Control relay 33, when energized, completes a locking circuit for itself independently of the contacts of controller 18 and also an energizing circuit for the closing coil 8. As soon as switch 5 closes, an energizing circuit is completed for control relay 34 which completes a locking circuit for itself as long as controller 18 remains in a position to effect the closing of switch 5. The energization of control relay 34 also interrupts the energizing circuit of control relay 33 so that it becomes deenergized and effects the deenergization of closing coil 8. In this manner closing coil 8 is energized only long enough to effect the closing of circuit breaker 5 and cannot be reenergized thereafter until associated control relay 34 has been deenergized by the subsequent movement of controller 18 to a position in which it effects the opening of circuit breaker 5.

Closing coil 9 of circuit breaker 6 has a similar pair of control relays 35 and 36 associated therewith and closing coil 10 also has a similar pair of control relays 37 and 38 associated therewith.

In order to effect the desired equal changes in the capacity connected to circuit 4 in certain of its positions, controller 18 has to open one of the circuit breakers at substantially the same instant that another of the circuit breakers is closed. Sometimes the open circuit breaker is closed before the other circuit breaker is closed or vice versa. Also due, for example, to the contacts on drum 19 being out of alignment, there may be a sufficient overlap between the closing of one breaker and the opening of another breaker in certain positions of the drum to allow voltage relay 14 and its associated control relay 15 or 16 to operate and prevent motor 20 from moving drum 19 far enough to effect the desired operation of the circuit breakers. In order to overcome this difficulty due to the sequential operation of the circuit breakers, I provide a time relay 39 which is so connected that, whenever the controller reaches a position in which it effects the opening of one breaker and the closing of another breaker, relay 39 maintains the circuit of motor 20 completed for a sufficient length of time independently of the position of voltage relay 14 to insure that controller drum 19 moves far enough to effect the proper operation of the circuit breakers. In the particular arrangement shown in the drawing relay 39 is of the well known time delay drop-out type, and an energizing circuit therefor is arranged to be completed by control relays 33, 35 and 37, respectively, whenever they are energized and also by a control relay 40 whenever it is energized. Relay 40 is arranged so that it is energized whenever circuit breaker 5 is closed and controller 18 is in a position to effect the opening of circuit breaker 5.

The operation of the arrangement shown in the drawing is as follows:

When circuit breakers 5, 6 and 7 are open and the voltage of circuit 4 decreases below a predetermined value so that relay 14 completes an energizing circuit for control relay 15, an energizing circuit is completed for time relay 17 through contacts 41 of relay 15 and contacts 42 of relay 39. If the voltage of circuit 4 remains below this predetermined value for a sufficient length of time, relay 17 closes its contacts 43 and completes a locking circuit for relay 15 through its contacts 80. The closing of contacts 43 also completes an energizing circuit for controller motor 20 through armature winding 21, field winding 23, contacts 44 of relay 15, contacts 45 of relay 16, and contact 31, segments and contact 24 of controller 18. Motor 20 then rotates in a direction to move drum 19 from its position a towards position b.

As drum 19 approaches its position b, an energizing circuit is completed for control relay 33 through contacts 46 of relay 34 and contact 25, segments and contact 24 of controller 18. The closing of contacts 47 of relay 33 completes a locking circuit for this relay which is independent of contacts 24 and 25 of controller 18. By closing its contacts 48, relay 33 completes an energizing circuit for closing coil 8 to effect the closing of circuit breaker 5 so as to connect capacitor 1 across circuit 4. By closing its contacts 49, relay 33 completes an energizing circuit for time relay 39.

When circuit breaker 5 closes its auxiliary contacts 50, an energizing circuit is completed for control relay 34 through contact 25, segments and contact 24 of controller 18. By closing its contacts 51, relay 34 completes a shunt circuit around contacts 50 of circuit breaker 5, and by opening its contacts 46, relay 34 interrupts the energizing circuit of relay 33 so that it becomes deenergized and interrupts the energizing circuits of closing coil 8 and time relay 39.

The energization of time relay 39, in response to the energization of relay 33, opens contacts 42 in the energizing circuit of time relay 17 so that it becomes deenergized and at its contacts 43 interrupts the original energizing circuit of motor 21 and the locking circuit for relay 15. However, by closing its contacts 52, relay 39 completes another locking circuit for relay 15, and by closing its contacts 52 and 53, relay 39 maintains the circuit of armature winding 21 and field winding 23 completed until after circuit breaker 5 has closed and has effected the deenergization of relay 33 which, in turn, effects the deenergization of time relay 39. Since relay 39 is of the time delay drop-out type, the circuit of motor 21 is maintained for a sufficient length of time after circuit breaker 5 is closed to insure that controller 9 reaches its stopping position b.

If the increase in capacity effected by the connection of capacitor 1 to circuit 4 does not restore the voltage thereof to normal so that voltage relay 14 effects the deenergization of control relay 15, the circuit of time relay 17 is reestablished as soon as time relay 39 closes its contacts 42. After being energized for a predetermined time, relay 17 again closes its contacts 43 and completes the heretofore described energizing circuit for armature winding 21 and field winding 23 so that motor 20 moves drum 19 from position b towards position c.

As drum 19 approaches its position c, segments on the drum complete, through contacts 26 and 27, circuits to effect the energization of control relay 40 associated with circuit breaker 5 and control relay 35 associated with circuit breaker 6. The energizing circuit of control relay 40 includes auxiliary contacts 53 on circuit breaker 5 and contact 26, segments and contact 24 of controller 18. By closing its contacts 54, relay 40 connects trip coil 11 in parallel therewith so that circuit breaker 5 is opened to disconnect capacitor 1 from circuit 4. By closing its contacts 60, relay 40 completes an energizing circuit for relay 39.

The energizing circuit of control relay 35 includes contacts 55 of control relay 36 and contact 27, segments and contact 24 of controller 18. By closing its contacts 56, relay 35 completes an energizing circuit for closing coil 9 to effect the closing of circuit breaker 6 so as to connect capacitor 2 across circuit 4. By closing its contacts 57, relay 35 completes a locking circuit for itself, and by closing its contacts 58, relay 35 completes an energizing circuit for time relay 39.

By closing its auxiliary contacts 59, circuit breaker 6 completes an energizing circuit for control relay 36 through contact 27, segments and contact 24 of controller 18. By closing its contacts 61, relay 36 completes a locking circuit for itself, and by opening its contacts 55, relay 36 interrupts the energizing circuit of control relay 35 so that it becomes deenergized and opens the energizing circuit of closing coil 9.

The energization of relay 39 maintains, in the manner heretofore described, the circuit of motor 20 completed for a sufficient length of time independently of the position of contact-making voltmeter 14 to insure that controller 18 reaches its stopping position $c$ and thereby effects the opening of circuit breaker 5 and the closing of circuit breaker 6.

If the increase in capacity connected to circuit 4 to a value equal to twice the value of the capacity of capacitor 1, which is effected by the closing of circuit breaker 6 and the opening of circuit breaker 5, does not restore the voltage of circuit 4 to its normal value so that relay 15 is deenergized, the circuit of time relay 17 is again established through contacts 42 of relay 39 as soon as this relay becomes deenergized in response to the deenergization of relays 35 and 40. Time relay 17 then completes, in the manner heretofore described, the energizing circuit of armature winding 21 and field winding 23 so that motor 20 moves the controller 18 out of its position $c$ and towards its position $d$.

As drum 19 approaches its position $d$, segments on the drum complete, through contacts 28 and 29, circuits to effect the energization of trip coil 12 associated with circuit breaker 6 and control relay 37 associated with circuit breaker 7. The energizing circuit of trip coil 12 includes auxiliary contacts 62 on circuit breaker 6 and contact 28, segments and contact 24 of controller 18. The energization of trip coil 12 effects the opening of circuit breaker 6 to disconnect capacitor 2 from circuit 4.

The energizing circuit of control relay 37 includes contacts 63 of relay 38 and contact 29, segments and contact 24 of controller 18. By closing its contacts 64, relay 37 completes an energizing circuit for closing coil 10 to effect the closing of circuit breaker 7 so as to connect capacitor 3 across circuit 4. By closing its contacts 65, relay 37 completes a locking circuit for itself, and by closing its contacts 66, relay 37 completes an energizing circuit of time relay 39.

By closing its auxiliary contacts 67, circuit breaker 10 completes an energizing circuit for control relay 38 through contact 29, segments and contact 24 of controller 18. By closing its contacts 68, relay 36 completes a locking circuit for itself, and by opening its contacts 63, relay 38 interrupts the energizing circuit of control relay 37 so that it becomes deenergized and opens the energizing circuit of closing coil 10.

The energization of relay 39, in response to the energization of relay 37, maintains, in the manner heretofore described, the circuit of motor 20 completed for a sufficient length of time, independently of the position of contact-making voltmeter 14, to insure that the controller reaches its stopping position $d$ and thereby effects the opening of circuit breaker 5 and the closing of circuit breaker 7.

If the increase in capacity connected to circuit 4 to a value equal to three times the value of the capacity of capacitor 1, effected by the closing of circuit breaker 7 and the opening of circuit breaker 6, does not restore the voltage of circuit 4 to its normal value, the circuit of time relay 17 is again established as soon as relay 39 recloses its contacts 42. Time relay 17 then completes, in the manner heretofore described, the energizing circuit of armature winding 21 and field winding 23 so that motor 20 moves the controller 18 out of its position $d$ and towards its position $e$.

As drum 19 approaches its position $e$, segments on the drum complete, through contact 25, the heretofore described circuit for control relay 33 to effect the closing of the circuit breaker 5, the deenergization of the time relay 17, and the energization and subsequent deenergization of the time relay 39 to insure that the controller 18 reaches its stopping position $e$.

Since circuit breaker 7 remains closed while controller 18 moves from its position $d$ to its position $e$, capacitors 1 and 3 are connected to circuit 4 as a result of the movement of the controller to its stopping position $e$. Control relays 33 and 34 and time relays 17 and 19 are controlled in the same manner as heretofore described in connection with the movement of the controller from its position $a$ to its position $b$.

If the increase in capacity connected to circuit 4 to a value equal to four times the capacity of capacitor 1, effected by the simultaneous connection of capacitors 1 and 3 to circuit 4, does not restore the voltage thereof to normal, the circuit of motor 20 is again completed by relay 17 a predetermined time after the controller reaches position $e$ so that the controller moves towards its position $f$. As the controller approaches its position $f$, circuits are completed, through contacts 26 and 27, to effect the opening of circuit breaker 5 and the closing of circuit breaker 6 in the same manner as when the controller moves its position $b$ to its position $c$. Since circuit breaker 7 remains closed while the controller moves from its position $e$ to its position $f$, capacitors 2 and 3 are connected to circuit 4 as a result of the movement of the controller to its stopping position $f$.

If the increase in capacity connected to circuit 4 to a value equal to five times the capacity of capacitor 1, effected by the simultaneous connection of capacitors 2 and 3 to circuit 4, does not restore the voltage thereof to normal, the circuit of motor 20 is again completed by relay 17 a predetermined time after stopping position $f$ is reached so that the controller moves towards its position $g$. As the controller approaches its position g, a circuit is completed, through contact 25, to effect the closing of circuit breaker 5 in the same manner as when the controller moves from its position a to its position b. Since circuit breakers 6 and 7 remain closed while the controller moves from its position f to its position g, capacitors 1, 2 and 3 are connected to circuit 4 as a result of the movement of the controller to its position f so that the capacity connected to circuit 4 is increased to a value equal to six times the capacity of capacitor 1. In position f of controller 18, the circuit, through its contact 31, is opened so that further movement of the controller is prevented in a direction which effects an increase in the amount of capacity connected to circuit 4.

If, while controller 18 is in its position g and capacitors 1, 2 and 3 are connected to circuit 4, the voltage of the circuit 4 exceeds a predetermined value, voltmeter 14 completes an energizing circuit for control relay 16 which, in turn, completes, through its contacts 70 and contacts 42 of relay 39, an energizing circuit for time relay 17. After being energized for a predetermined time, relay 17 closes its contacts 43 and completes a locking circuit for relay 16 through its contacts 81. The closing of contacts 43 also completes an energizing circuit for motor 20 through armature winding 21, field winding 22, contacts 71 of relay 16, contacts 72 of relay 15 and segment 32. Motor 20 then rotates in a direction to move drum 19 from its position g to its position f.

As the drum approaches its position f, a circuit is completed, through contact 26, for control relay 40 to effect the opening of circuit breaker 5 in the same manner as when the controller moves from its position b to its position c. Control relay 40 also controls time relays 17 and 39, in the same manner as heretofore described, to insure that the controller reaches its stopping position f in case the voltage of circuit 4 is restored to normal before the controller reaches that position.

If the decrease in the capacity connected to circuit 4 to a value equal to five times the capacity of capacitor 1, effected by the disconnection of the capacitor 1 from circuit 4, does not restore the voltage of circuit 4 to normal, the circuit of motor 20 is again completed by relays 16 and 17 a predetermined time after stopping position f is reached so that the controller moves towards its position e.

As the controller approaches its position e, a circuit is completed through contact 25 to effect the closing of circuit breaker 5, in the manner heretofore described, and another circuit is completed, through contact 28, to effect the opening of circuit breaker 6 in a manner heretofore described. Since circuit breaker 7 remains closed while the controller moves from its position f to its position e, capacitors 1 and 3 are connected to circuit 4 as a result of the movement of the controller to its position e. The energization of control relay 33, during the closing operation of circuit breaker 5, controls time relays 17 and 39, in the same manner as heretofore described, to insure that the controller reaches its stopping position e in case the voltage of circuit 4 is restored to normal before the controller reaches position e.

If the decrease in the capacity connected to circuit 4 to a value equal to four times the capacity of capacitor 1, effected by the movement of the controller to position e, does not restore the voltage of circuit 4 to normal, the circuit of motor 20 is again completed by relays 16 and 17 a predetermined time after stopping position e is reached so that the controller moves towards its position d.

As the controller approaches its position d, a circuit is completed, through contact 26, to effect the opening of circuit breaker 5 in a manner heretofore described. Since circuit breaker 7 remains closed while the controller moves from its position e to its position d, capacitor 3 is connected to circuit 4 when position d is reached.

If the decrease in the capacity connected to circuit 4 to a value equal to three times the capacity of capacitor 1, effected by the movement of the controller to position d, does not restore the voltage of circuit 4 to normal, the circuit of motor 20 is again completed by relays 16 and 17 a predetermined time after stopping position d is reached so that the controller moves towards its position c.

As the controller approaches its position c, a circuit is completed, through contact 27, to effect the closing of circuit breaker 6 in a manner heretofore described. Also a circuit is completed for trip coil 13 through contacts 74 of circuit breaker 7, and contact 30, segments and contact 24 of controller 18. The energization of trip coil 13 effects the opening of circuit breaker 7 so that capacitor 3 is disconnected from circuit 4. Therefore, as a result of the controller moving from position d to position c, capacitor 3 is disconnected from circuit 4 and capacitor 2 is reconnected to circuit 4 so that the capacity connected to circuit 4 is reduced to a value equal to twice the capacity of capacitor 1.

If the voltage of circuit 4 is not restored to normal by the reconnection of capacitor 2 thereto, the circuit of motor 20 is again completed by relays 16 and 17 a predetermined time after position c is reached so that the controller moves towards position b. As the controller approaches its position b, circuits are completed, through contacts 25 and 26, to effect, in the manner heretofore described, the closing of circuit breaker 5 and the opening of circuit breaker 6 so that capacitor 2 is disconnected from circuit 4 and capacitor 1 is reconnected to circuit 4, so that the capacity connected to circuit 4 is reduced to the capacity of capacitor 1. If the voltage of circuit 4 is not restored to normal as a result of the movement of the controller to its position b, the circuit of motor 20 is again completed by relays 16 and 17 a predetermined time after position b is reached so that the controller moves towards its position a. As the controller approaches its position a, a circuit is completed, through contact 26, to effect the opening of circuit breaker 5, in the manner heretofore described, so that capacitor 1 is disconnected from circuit 4. Since in position a the circuit, through contact 32 of controller 18, is open, further movement of the controller is prevented in a direction which effects a decrease in the amount of capacity connected to circuit 4.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modification as fall within the true spirit and scope of my invention.

What I claim as new and desire to secure by Letters Patent of the United States is:

1. In combination, an electric circuit, a plurality of reactance devices, individual switching means controlling the connection between each device and said circuit, a multiposition switch, means controlled by the position of said switch for effecting predetermined operations of said switching means, means responsive to a predetermined electric condition of said circuit for effecting the movement of said switch through its various positions, and means responsive to the operation of said switching means for continuing independently of said electric condition the movement of said switch for a predetermined time afer said switch has effected a predetermined operation of said switching means.

2. In combination, an electric circuit, a plurality of reactance devices, individual switching means controlling the connection between each device and said circuit, a multiposition switch, means controlled by the position of said switch for effecting the substantially simultaneous opening and closing of different switching means, means responsive to a predetermined electric condition of said circuit for effecting the movement of said switch from one position to another, and means responsive to the operation of said switching means for continuing independently of said electric condition the movement of said switch for a predetermined time after said switch has effected the closing of certain of said switching means.

3. In combination, an electric circuit, a plurality of reactance devices, individual switching means controlling the connection between each device and said circuit, a multiposition switch, means controlled by the position of said switch for effecting the substantially simultaneous opening and closing of different switching means, means responsive to a predetermined electric condition of said circuit for effecting the movement of said switch from one position to another, and means responsive to the operation of said switching means for continuing independently of said electric condition the movement of said switch for a predetermined time after said switch has effected the opening of certain of said switching means.

4. In combination, an electric circuit, a plurality of reactance devices respectively having reactances which differ in an arithmetical progression, individual switching means controlling the connection between each device and said circuit, a reversible motor driven multiposition switch, means controlled by said switch for effecting the opening and closing of said switching means in a predetermined sequence when said motor rotates in one direction and in the reverse sequence when said motor rotates in the opposite direction, means responsive to a predetermined electric condition of said circuit for effecting the rotation of said motor, and timing means responsive to the operation of said switching means operative to continue independently of said electric condition the rotation of said motor in the direction it is rotating for a predetermined time after said switch has effected predetermined operations of said switching means.

5. In combination, an electric circuit, a plurality of reactance devices respectively having reactances which differ in an arithmetical progression, individual switching means controlling the connection between each device and said circuit, a reversible motor driven multiposition switch, means controlled by said switch for effecting the opening and closing of said switching means in a predetermined sequence when said motor rotates in one direction and in the reverse sequence when said motor rotates in the opposite direction, means responsive to a predetermined electric condition of said circuit for effecting the rotation of said motor, and timing means responsive to the operation of said switching means operative to continue independently of said electric condition the rotation of said motor in the direction it is rotating for a predetermined time after said switch has effected the closing of any of said switching means and the opening of certain of said switching means.

6. In combination, an electric circuit, a plurality of reactance devices connected to said circuit, said devices respectively having reactances which differ in an arithmetical progression, individual switching means controlling the connections between each device and said circuit, a multiposition switch, means responsive to the movement of said switch for effecting the operation of said switching means so as to vary the amount of reactance connected to said circuit in increments equal to the reactance of the device having the smallest reactance, means responsive to a predetermined electric condition of said circuit for effecting the movement of said switch from one position to another, and means responsive to the operation of said switching means for continuing independently of said electric condition the movement of said switch for a predetermined time after said switch has effected predetermined operations of said switching means.

ARVID E. ANDERSON.